US011177688B2

(12) United States Patent
Vihersalo et al.

(10) Patent No.: US 11,177,688 B2
(45) Date of Patent: Nov. 16, 2021

(54) UNINTERRUPTIBLE POWER SUPPLY, ARC QUENCHING DEVICE, ELECTRICAL APPLIANCE AND METHOD FOR REDUCING AN ARC ENERGY

(71) Applicant: Eaton Intelligent Power Limited, Dublin (IE)

(72) Inventors: Jussi Olavi Vihersalo, Vantaa (FI); Janne Mikael Paananen, Jyvaeskylae (FI)

(73) Assignee: EATON INTELLIGENT POWER LIMITED, Dublin (IE)

( * ) Notice: Subject to any disclaimer, the term of this patent is extended or adjusted under 35 U.S.C. 154(b) by 142 days.

(21) Appl. No.: 16/517,711

(22) Filed: Jul. 22, 2019

(65) Prior Publication Data

US 2020/0036221 A1 Jan. 30, 2020

(30) Foreign Application Priority Data

Jul. 24, 2018 (GB) ..................................... 1812016

(51) Int. Cl.
*H02J 9/06* (2006.01)
*H02H 7/22* (2006.01)
*H02H 1/00* (2006.01)

(52) U.S. Cl.
CPC ........... *H02J 9/062* (2013.01); *H02H 1/0023* (2013.01); *H02H 7/22* (2013.01)

(58) Field of Classification Search
CPC .......... H02J 9/062; H02H 1/0023; H02H 7/22
USPC ................................................ 307/64, 65, 66
See application file for complete search history.

(56) References Cited

U.S. PATENT DOCUMENTS

| 2005/0036253 | A1* | 2/2005 | Tian .......................... H02J 3/38 361/66 |
| 2009/0195075 | A1* | 8/2009 | Ziegler .................... H02J 9/061 307/66 |
| 2016/0111916 | A1 | 4/2016 | Prakash et al. |

FOREIGN PATENT DOCUMENTS

| DE | 19952507 A1 | 6/2001 |
| JP | 2007006675 A | 1/2007 |

* cited by examiner

Primary Examiner — Michael R. Fin
(74) Attorney, Agent, or Firm — Leydig, Voit & Mayer, Ltd.

(57) ABSTRACT

An online, double-conversion uninterruptible power supply includes: a UPS input; a rectifier, whose input is connected to the UPS input; an inverter, whose input is connected to an output of the rectifier; a UPS output connected to an output of the inverter; a bypass switch connected between the UPS input and the UPS output; a control unit for closing the bypass switch in case of excessive output current and/or excessive voltage drop and/or excessive power demand at the UPS output; and an override input, which, when activated, inhibits closing the bypass switch.

21 Claims, 2 Drawing Sheets

UNINTERRUPTIBLE POWER SUPPLY, ARC QUENCHING DEVICE, ELECTRICAL APPLIANCE AND METHOD FOR REDUCING AN ARC ENERGY

CROSS-REFERENCE TO PRIOR APPLICATION

Priority is claimed to British Patent Application No. GB 1812016.2, filed on Jul. 24, 2018, the entire disclosure of which is hereby incorporated by reference herein.

FIELD

The invention relates to an online, double-conversion uninterruptible power supply (UPS), comprising a UPS input, a rectifier, which with its input is connected to the UPS input, an inverter, which with its input is connected to an output of the rectifier and a UPS output being connected to the output of the inverter. Furthermore, the online, double-conversion UPS comprises a bypass switch between the UPS input and the UPS output and a control unit for closing the bypass switch in case of excessive output current and/or excessive voltage drop and/or excessive power demand at the UPS output. Furthermore, the invention relates to a combined power supply and arc quenching device, comprising a fault arc detection device. Moreover, the invention relates to an electrical appliance, which comprises a grid connection to a power grid, a combined power supply, and arc quenching device, wherein a UPS input is connected to the grid connection, an electrical consumer is connected to the UPS output and a circuit breaker is arranged between the grid connection and the consumer for disconnecting said consumer from the power grid a) in case of an excessive current flowing over the circuit breaker and/or b) by means of a fault arc signal from the combined power supply and arc quenching device being connected to said circuit breaker. Finally, the invention relates a method of quenching a fault arc in an electrical appliance, wherein a fault arc is detected by means of the fault arc detection device.

BACKGROUND

An online, double-conversion UPS, a combined power supply and arc quenching device, an electrical appliance and a method of the above type are known in principle. Generally, it is possible that unwanted short circuits or arc faults occur in such an electrical appliance. For example, animals, (wet) dirt or even tools falling onto bare conductors during an inspection can reduce the insulation or the spark gap between two conductors at different voltage potential such that such a fault arc occurs. High arc currents can cause violent explosions because the air in the vicinity of the arc is heated up in a very short time. In electrical low voltage installations, a fault arc is one of the most dangerous forms of a fault that can create a serious hazard for personnel and facilities. Furthermore, long downtime due to excessive damage to equipment, such as electrical distribution panels, may be caused.

Existing solutions to reduce the impact of a fault arc are based on fault arc detection devices that trip the circuit protection devices such as circuit breakers and reduce the time and therefore the energy of the fault arc. Existing methods are focused on cutting off the faulty areas of an electrical appliance from AC mains as fast as possible.

For example, D 199 52 507 A1 discloses a method, in which a fault arc is detected by sensors and as a result switches, in particular, semiconductor switches, are activated and switch a short circuit in order to extinguish the fault arc in a very short time.

Unfortunately, switching devices capable of cutting off very high currents in a very short time are technically complex and very expensive. And whatever efforts are taken, the delay time between the occurrence of a fault arc and switching off the faulty area from the power grid cannot be reduced to zero.

SUMMARY

In an embodiment, the present invention provides an online, double-conversion uninterruptible power supply, comprising: a UPS input; a rectifier, whose input is connected to the UPS input; an inverter, whose input is connected to an output of the rectifier; a UPS output connected to an output of the inverter; a bypass switch connected between the UPS input and the UPS output; a control unit configured to close the bypass switch in case of excessive output current and/or excessive voltage drop and/or excessive power demand at the UPS output; and an override input, which, when activated, is configured to inhibit closing the bypass switch.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
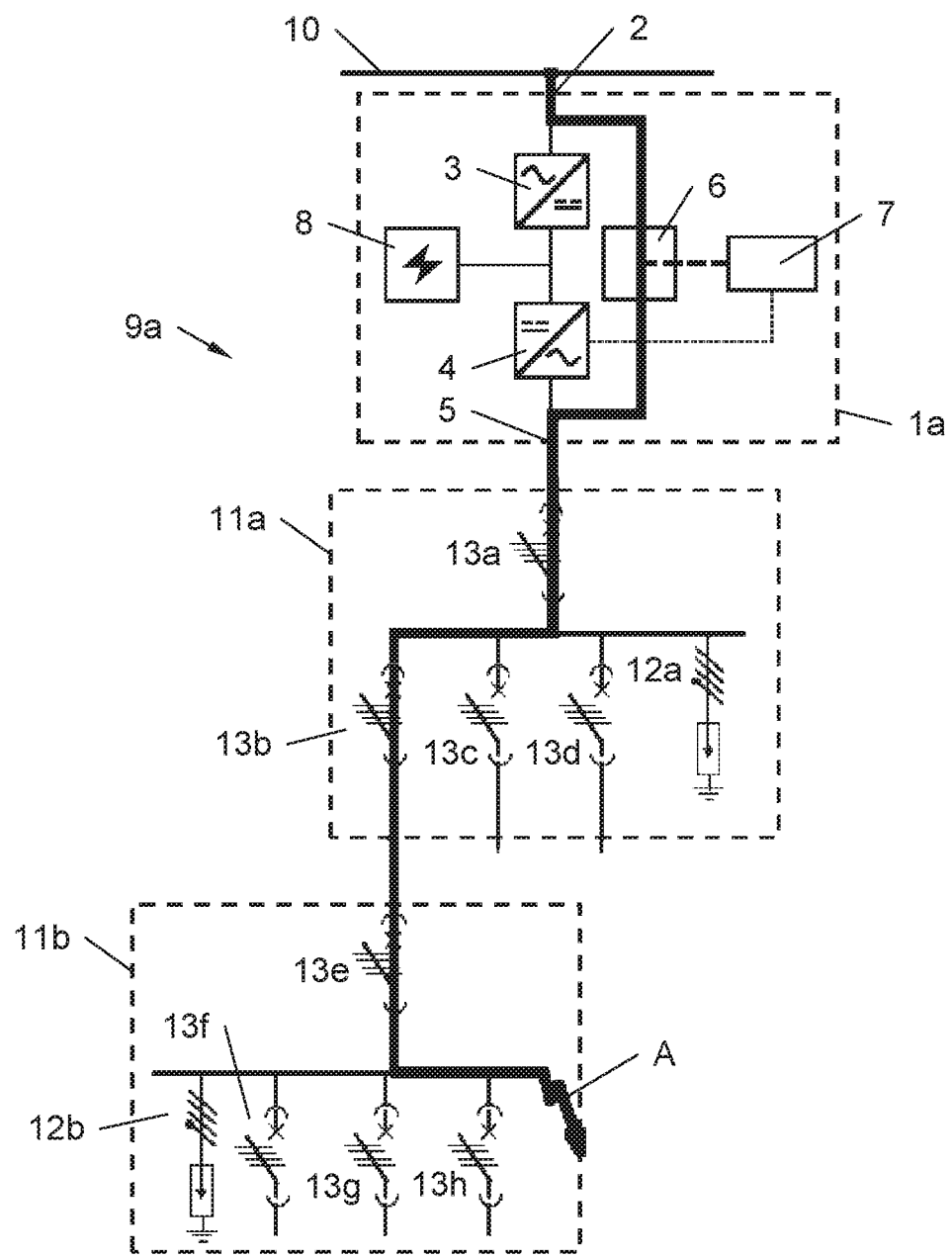
FIG. 1 shows a prior art electrical appliance with a traditional cut off system for a fault arc and FIG. 2 shows an electrical appliance with the proposed cut off system for a fault arc.

In an embodiment, the present invention provides an improved online, double-conversion UPS, an improved combined power supply and arc quenching device, an improved electrical appliance and an improved method of quenching a fault arc in an electrical appliance. In particular, the destructive impact of a fault arc can be reduced and hazards kept away from electrical equipment and personnel. Furthermore, long downtimes due to excessive damage to the equipment, such as electrical distribution panels, can be avoided.

In an embodiment, the present invention provides an online, double-conversion uninterruptible power supply (UPS) as defined in the opening paragraph, additionally comprising an override input, which when activated inhibits closing the bypass switch.

Furthermore, in an embodiment, the present invention provides a combined power supply and arc quenching device as defined in the opening paragraph, comprising an online, double-conversion UPS of the type above, wherein an output of the fault arc detection device is connected to the override input of the uninterruptible power supply in a way that the bypass switch is kept open if a fault arc is detected by the fault arc detection device.

Moreover, in an embodiment, the present invention provides an electrical appliance as defined in the opening paragraph, comprising a combined power supply and arc quenching device of the above type.

Finally, in an embodiment, the present invention provides an arc quenching method as defined in the opening paragraph, wherein a signal is sent from the fault arc detection device to the online, double-conversion UPS causing the bypass switch held open.

An "online, double-conversion uninterruptible power supply" is an uninterruptible power supply (UPS), which is always active, i.e. not just in case of a voltage drop in a power grid, to which the UPS is connected via its UPS input, but also when the power grid provides a nominal voltage. For compensating short power drops in the power grid, the UPS may comprise a capacitor between the rectifier and the inverter. For compensating longer power drops in the power grid, the UPS may comprise an internal battery or a connector for an external battery between the rectifier and the inverter.

Because the rectifier and the inverter are continuously in the current path between the power grid and an electrical consumer, no power transfer switch is necessary to switch the UPS "on" when there is a voltage drop in the power grid and to switch the UPS "off" when the power grid provides nominal voltage again like it is in case of an offline, standby or line-interactive UPS. When a power loss occurs in the power grid, the rectifier simply drops out of the circuit and the batteries keep the power at the UPS output steady and unchanged. When power is restored in the power grid, the rectifier resumes carrying most of the load and begins charging the capacitor and/or the battery. Hence, in an online, double-conversion UPS, the inverter is fed by a capacitor/the battery or by the rectifier connected to the power grid (AC mains).

Usually, an online, double-conversion UPS is particularly used to compensate "short" power drops in the power grid, i.e. short fluctuations of the grid voltage like spikes, sags, outages and other anomalies. Accordingly, the online, double-conversion UPS is ideal for environments where electrical isolation is necessary or for equipment that is very sensitive to power fluctuations, like sensitive electronic or IT equipment. However, depending on the size of the battery, also "long" power drops in the power grid may be compensated by the online, double-conversion UPS.

An online, double-conversion UPS moreover comprises a bypass switch connected between the UPS input and the UPS output, which is closed in case of excessive power demand and/or excessive voltage drop and/or excessive output current. Accordingly, the rectifier, the inverter, and the capacitor/the battery are bypassed, and the electrical consumer is directly switched to the power grid, i.e. AC mains. Usually, the power grid can drive much more power than the UPS, and by switching over to the bypass, the electrical consumer keeps in operation, even if the power demand excesses the power the UPS can drive.

This behavior is also used in case of electrical faults in the electrical appliance, which the UPS is part of, in case of short circuits or arc faults. Also in these cases, the power demand at the UPS output excesses the capability of the inverter, and the control unit of the UPS causes a switchover to the bypass. In turn, the short circuit or the fault arc is directly fed by the power grid thus causing excessive currents in the current path leading to the short circuit or the fault arc. As a consequence, a circuit breaker in said current path cuts off power from the electrical fault and clears the situation. The UPS then switches over to conversion mode again and supplies the remaining parts of the electrical appliance with electricity. In case of a fault arc, the fault arc may be quenched by a short-circuiting switch, which quenches the fault arc by generating a short circuit between the conductors between the fault arc burns.

One should note that "excessive output current" and/or "excessive voltage drop" and/or "excessive power demand" at the UPS output in the above context particularly means an output current above a current threshold, a voltage drop below a voltage threshold or a power demand above a power threshold.

Existing methods are not focused on a reduction of the actual arc current, but are focused on cutting off the faulty areas of an electrical appliance from AC mains as fast as possible.

In contrast, this invention is using existing technology, that is a fault arc detection device, to control a UPS in a way to reduce the actual arc current by preventing the UPS from switching into bypass mode. As a consequence, the UPS feeds a fault arc with the inverter, wherein the current is limited by the inverter current limit, which is typically 2 to 3 times the nominal current and substantially lower than the arc current available from AC mains.

Since the arc energy grows as the square of the current, limiting the arc current with the UPS inverter reduces the arc energy to a fraction of the arc energy appearing otherwise.

This reduces the risk for personnel and installation and limits the damage to equipment caused by the fault arc. Furthermore, long downtimes due to excessive damage to the electrical appliance is avoided.

In detail, the fault arc detection device monitors the electrical appliance downstream of the UPS. Once the fault arc detection device detects a fault arc, it outputs a fast signal to the UPS to prevent it from transferring to bypass mode and to keep feeding the fault arc with the inverter of the UPS thus limiting the arc current. Optionally, the UPS annunciates an alarm related to the fault arc detection signal.

The fault arc detection device can also output a trip signal to a circuit breaker feeding the faulty area of the electrical appliance to quickly isolate the faulty circuit. The quick disconnection of the fault arc reduces the arc energy even more and minimizes the impact of the fault to other parallel circuits fed by same UPS. A typical arc clearing time using a fault arc detection device is approximately 30-50 ms including both the detection time and circuit breaker operation time. Within this time, excessive air pressure caused by the fault arc can already cause significant damage to equipment and hurt of human beings. Limiting the arc current before the fault arc is cleared by means of a circuit breaker, substantially decreases air pressure and heat impact of a fault arc in view of prior art systems.

It can also happen that the maximum output current of the inverter is lower than the minimum current for keeping the fault arc burning. The fault arc is quenched "automatically" than without the intervention of a short-circuiting switch and a circuit breaker. In this case, the hazardous situation is simply cleared by the current limitation of the inverter. As a consequence, the electrical appliance can move over to normal operation again almost immediately.

The override input of the UPS may be connected to the control unit for closing the bypass switch between the UPS input and the UPS output so that it is inhibited from being closed indirectly. In this way, the control unit may take further considerations and close the switch despite an active override signal under certain circumstances. However, the override input of the UPS may alternatively be connected with the bypass switch so that it is directly inhibited from being closed. That means an active override signal keeps the switch open anyway.

The term "activated" in the above context does not necessarily imply a positive signal, but the bypass switch may also be kept open by a negative signal or the absence of a signal. For example, a positive signal is sent to the override input in case of a fault arc if a positive signal keeps the bypass switch open, and a negative signal is sent to the override input in case of a fault arc if a negative signal keeps the bypass switch open. Other signal types may be applicable as well, for example, AC signals or binary signals.

The fault arc detection device beneficially comprises a current detector and/or a light detector. Accordingly, the trip signal used for circuit breakers can be caused by excessive current, excessive light or a combination of both. Using both the current and the light to classify an event as an arc fault reduces the risk of accidental tripping of the circuit breaker.

However, even if the signal from the fault arc detection device is erroneous and based on the misinterpretation of an event (i.e. the fault arc detection device outputs a fault arc signal although in fact there is no fault arc), the UPS simply stays in normal mode and supplies the electrical consumers via the rectifier inverter combination. Possibly, a superfluous alarm signal is output. However, this has just a very low impact to system reliability in critical applications.

By combining the fault arc detection device with an online, double-conversion uninterruptible power supply and a circuit protection, a fast and reliable possibility to significantly reduce the arc energy and associated risks and damages is provided. This is very beneficial for many electrical installations used in hospitals, data centers and other mission-critical applications due to improved safety and reduced downtime in case of a fault.

Advantageously, the online, double-conversion uninterruptible power supply may be designed in a way that the override input when activated turns off the inverter. In other words, advantageously the inverter is turned off when the signal causing the bypass switch held open is received. In this way, the energy of the fault arc can be reduced even more as the inverter can be turned off very fast (e.g. in around 2 ms or even faster). For this reason, the control unit of the online, double-conversion UPS can be connected to the inverter (particularly to the gate inputs or base inputs of switching transistors of the inverter) and may force the inverter (i.e. its switching transistors) to the non-conductive state.

In yet another beneficial embodiment, the rectifier can be turned off when the signal causing the bypass switch held open is received instead of the inverter or in addition to the inverter. This is true if the rectifier is an active rectifier comprising transistors. If there is a battery being connected to the output of the rectifier and to the input of the inverter, also the battery may be disconnected from the inverter when said signal is received. This is particularly true if just the rectifier (and not the inverter) is turned off when said signal is received. Accordingly, the control unit of the online, double-conversion uninterruptible power supply can be connected to the rectifier (particularly to the gate inputs or base inputs of transistors of the rectifier) and may force the rectifier (i.e. its transistors) to the non-conductive state. The control unit of the online, double-conversion UPS can also be connected to a battery switch between the battery and the rectifier and the inverter, which battery switch may be forced to its non-conductive state.

Hence, generally, an online, double-conversion uninterruptible power supply is of advantage if the signal causing the bypass switch held open i) turns off the inverter (independent of whether there is a battery being connected to the output of the rectifier and to the input of the inverter or not), or ii) turns off the rectifier if there is no battery being connected to the output of the rectifier and to the input of the inverter, or iii) turns off the rectifier and disconnects the battery from the inverter if there is a battery being connected to the output of the rectifier and to the input of the inverter.

In yet another advantageous embodiment, the inverter is turned off and/or the rectifier is turned off and/or the battery is disconnected from the inverter when said signal is received and an output current at the UPS output is above a predetermined current threshold. Accordingly, superfluously cutting off the electrical appliance, which is fed by the online, double-conversion UPS, is avoided.

Furthermore, it is advantageous if the inverter is turned on again after a (first) predetermined time span and/or if the rectifier is turned on again after a (second) predetermined time span and/or if the battery is connected to the inverter again after a (third) predetermined time span. In this way, the online, double-conversion UPS changes over to normal operation automatically after the fault arc has been quenched. The first, second and third time span may differ from one another or may be the same.

It should be noted at this point that the embodiments and associated advantages disclosed in the context of the online, double-conversion UPS, the combined power supply and arc quenching device and the electrical appliance equally apply to the method of quenching a fault arc in an electrical appliance and vice versa.

Generally, same parts or similar parts are denoted with the same/similar names and reference signs. The features disclosed in the description apply to parts with the same/similar names respectively reference signs. Indicating the orientation and relative position (up, down, sideward, etc) is related to the associated figure, and an indication of the orientation and/or relative position has to be amended in different figures accordingly as the case may be.

FIG. 1 shows a prior art online, double-conversion uninterruptible power supply 1*a*, which comprises a UPS input 2, a rectifier 3, which with its input is connected to the UPS input 2, an inverter 4, which with its input is connected to an output of the rectifier 3, a UPS output 5 being connected to the output of the inverter 4, a bypass switch 6 between the UPS input 2 and the UPS output 5 and a control unit 7 for closing the bypass switch 6 in case of excessive output current and/or excessive voltage drop and/or excessive power demand at the UPS output 5.

Furthermore, the online, double-conversion UPS 1*a* comprises a battery 8 being connected to the output of the rectifier 3 and to the input of the inverter 4. The battery 8 may be an internal battery as shown in FIG. 1 or an external battery, which is connected to a battery connector between the output of the rectifier 3 and the input of the inverter 4. Alternatively or in addition, the online, double-conversion UPS 1*a* may comprise an internal or external capacitor connected to the output of the rectifier 3 and to the input of the inverter 4.

The online, double-conversion UPS 1*a* is part of a prior art electrical appliance 9*a*, wherein the UPS input 2 is connected to a power grid (AC mains) 10. Hence, the UPS input 2 forms a grid connection of the electrical appliance 9*a* to the power grid 10. The electrical appliance 9*a* comprises a number of appliance sections 11*a*, 11*b*, each having a number of electrical consumers, a number of short-circuiting switches 12a, 12b and a number of circuit breakers 13a . . . 13h.

The function of the electrical appliance 9a shown in FIG. 1 is as follows:

In normal operation, the appliance sections 11a, 11b with their electrical consumers are powered by the online, double-conversion UPS 1a via its rectifier 3 and its inverter 4, that means that the bypass switch 6 is open in this state. During normal operation, also the circuit breakers 13a . . . 13h are closed (unless they are intentionally and manually opened to switch off certain sections 11a, 11b of the electrical appliance 9a). By means of the battery 8, fluctuations such as voltage spikes and sags occurring in the power grid 10 are compensated so that the electrical consumers are powered by a constant voltage.

In case of an excessive output current and/or excessive voltage drop and/or excessive power demand at the UPS output 5, the control unit 7 closes the bypass switch 6 so as to suspend the power limitation caused by the inverter 4. Typically, the maximum inverter current is 2 to 3 times the nominal current. However, even this maximum inverter current is substantially lower than the maximum current available from the power grid 10. By switching over to the bypass, the electrical consumers can be powered, even in case of excessive power demand.

However, a short circuit or a fault arc is also interpreted as an excessive power demand, which may be detected by the control unit 7 by detecting a voltage drop at the UPS output 5. Accordingly, the control unit 7 switches over to bypass mode also in case of a short circuit or a fault arc. In FIG. 1 such a case is illustrated by the fault arc A and the associated current path drawn with bold lines.

In turn, the short-circuiting switch 12b associated with the fault arc A is closed to quench the fault arc A. Then, one of the circuit breakers 13a, 13b or 13e cuts off the faulty section of the electrical appliance 9a as a consequence of the excessive current flowing over said circuit breakers 13a, 13b or 13e. By providing different current trigger levels for the circuit breakers 13a . . . 13h, cutting off can take place in a predetermined way. Usually, care is taken, that small sections 11a, 11b of the electrical appliance 9a are switched off in case of an arc fault. In FIG. 1 this means, that the circuit breaker 13b or 13e shall open in case of the fault arc A.

In the end, the hazardous situation is cleared. However, clearing takes some time and the fault arc A may cause serious damage to the electrical appliance 9a or injury of personnel in the electrical appliance 9a even in this short time period of about 30-50 ms, which is necessary to clear the hazardous situation.

To reduce the destructive impact of a fault arc A, a modified online, double-conversion uninterruptible power supply 1b is proposed, which again comprises a UPS input 2, a rectifier 3, which with its input is connected to the UPS input 2, an inverter 4, which with its input is connected to an output of the rectifier 3, a UPS output 5 being connected to the output of the inverter 4, a bypass switch 6 being between the UPS input 2 and the UPS output 5 and a control unit 7 for closing the bypass switch 6 in case of excessive output current and/or excessive voltage drop and/or excessive power demand at the UPS output 5. In addition, the proposed online, double-conversion UPS 1b comprises an override input 14, which when activated inhibits closing the bypass switch 6. Such an online, double-conversion UPS 1b is shown in FIG. 2.

Figure 2:
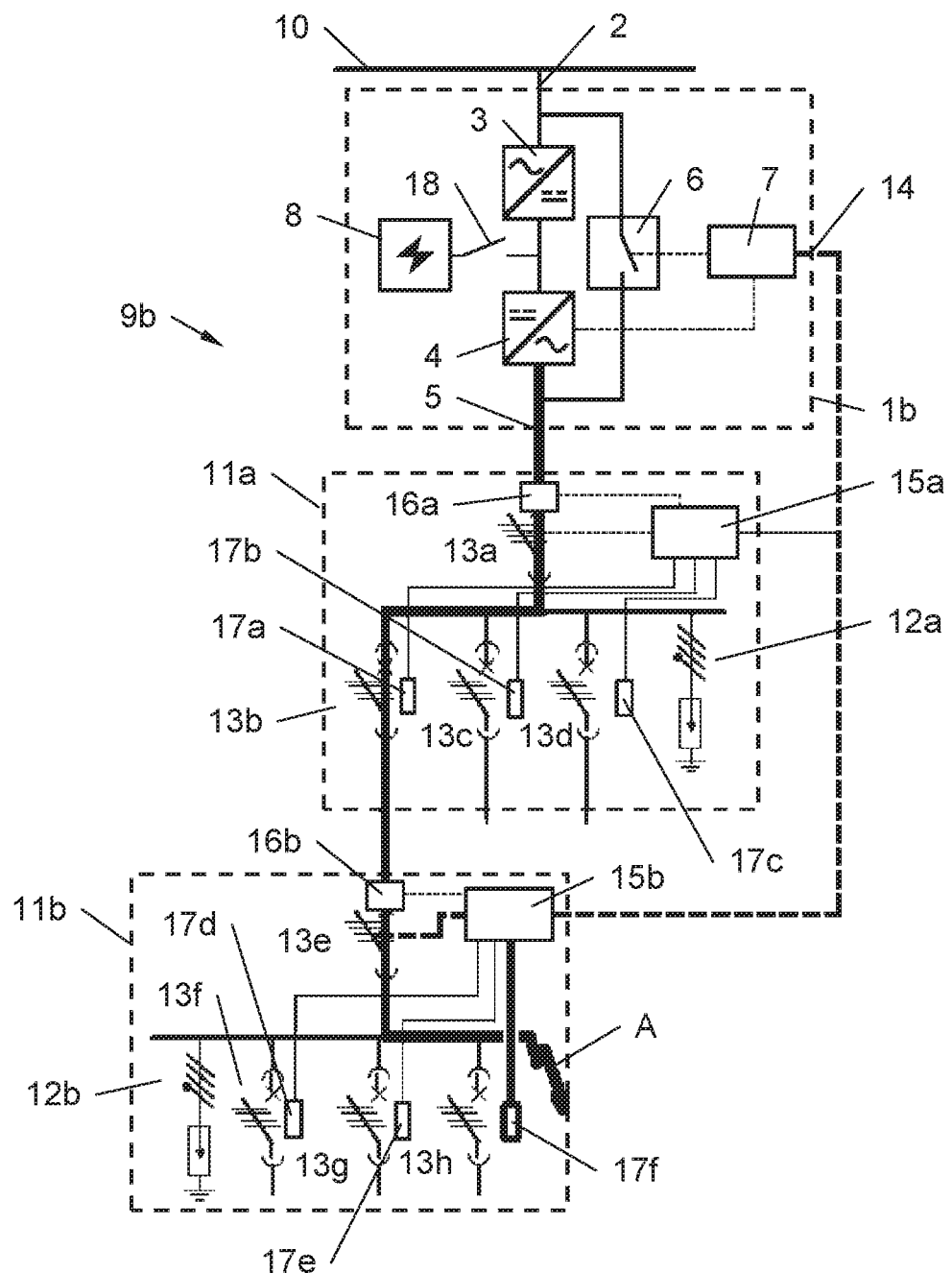

Furthermore, the electrical appliance 9b shown in FIG. 2, which is similar to the electrical appliance 9a shown in FIG. 1, in addition, comprises fault arc detection devices 15a, 15b, which in this embodiment are connected to current detectors 16a, 16b and light detectors 17a . . . 17f. Alternatively, embodiments are imaginable in which the fault arc detection devices 15a, 15b are just connected to current detectors 16a, 16b or just connected to light detectors 17a . . . 17f.

The online, double-conversion UPS 1b together with the fault arc detection devices 15a, 15b, the current detectors 16a, 16b and the light detectors 17a . . . 17f may be seen and denoted as a "combined power supply and arc quenching device". Moreover, the short-circuiting switches 12a, 12b and/or the circuit breakers 13a . . . 13h may be part of such a combined power supply and arc quenching device, too.

The function of the electrical appliance 9b shown in FIG. 2 is as follows:

Again, the appliance sections 11a, 11b with their electrical consumers are powered by the online, double-conversion UPS 1a via its rectifier 3 and its inverter 4 in normal operation, that means that the bypass switch 6 is open in this state. During normal operation, also the circuit breakers 13a . . . 13h are closed (unless they are intentionally and manually opened to switch off certain sections 11a, 11b of the electrical appliance 9b). By means of the battery 8, fluctuations such as voltage spikes and sags occurring in the power grid 10 are compensated so that the electrical consumers are powered by a constant voltage.

If there is an excessive output current and/or excessive voltage drop and/or excessive power demand at the UPS output 5, the system distinguishes between an arc fault and other power demanding processes. In case of a power demanding process in the electrical appliance 9b other than an arc fault, the control unit 7 causes the UPS 1b to switch over into bypass mode by closing the bypass switch 6.

Arc faults are managed in a different way. An arc fault is generally detected by the fault arc detection devices 15a, 15b, if both a current detector 16a, 16b and a light detector 17a . . . 17f signals an abnormal situation. If a fault arc A occurs, excessive light is detected via the light detector 17f and an excessive current is detected at current detectors 16a, 16b. Accordingly, the fault arc detection device 15b signals a fault arc event. In turn, a signal is sent from the fault arc detection device 15b to the online, double-conversion UPS 1b causing the bypass switch 6 held open. In detail, the signal is fed into the override input 14 of the online, double-conversion UPS 1b. So, although a voltage drop is detected at the UPS output 5 by the control unit 7, current still flows over the rectifier 3 and the inverter 4 as this is depicted in FIG. 2 by the fault arc A and the associated current path drawn with bold lines.

In this embodiment, the override input 14 is connected to an input of the control unit 7 so that the bypass switch 6 it is inhibited from being closed indirectly. In this way, the control unit 7 may take further considerations and close the bypass switch 6 despite an active override signal under certain circumstances. However, the override input 14 may alternatively be connected with the bypass switch 6 so that switching over to bypass mode is directly influenced. That means an active override signal keeps the bypass switch 6 open in any case.

Thus, in case of a fault arc event, the current fed to the fault arc A is limited by the maximum output current of the inverter 4. As said, the maximum inverter current typically is 2 . . . 3 times the nominal current and much lower than the maximum current available from the power grid 10. By keeping the online, double-conversion UPS 1b in normal mode, the current fed to the fault arc A is significantly lower than the current occurring in a prior art electrical appliance 1*a*. Two cases are imaginable:

Case a) Again, the short-circuiting switch 12*b* associated with the fault arc A is closed to quench the fault arc A. Then, one of the circuit breakers 13*a*, 13*b* or 13*e* cuts off the faulty section of the electrical appliance 9*b* as a consequence of the excessive current flowing over said circuit breakers 13*a*, 13*b* or 13*e*. By providing different current trigger levels for the circuit breakers 13*a* . . . 13*h*, cutting off can take place in a predetermined way. Alternatively, a particular circuit breaker 13*e* may be directly triggered by the fault arc detection device 15*b* as this is depicted in FIG. 2. In this example, circuit breaker 13*e* is tripped. In the same way, the short-circuiting switch 12*b* may be tripped by the fault arc detection device 15*b* directly.

Case b) If the maximum output current of the inverter 4 is lower than the minimum current for keeping the fault arc A burning, the fault arc A is quenched "automatically" without the intervention of the short-circuiting switch 12*b* and the circuit breakers 13*a*, 13*b* or 13*e*. In this case, the hazardous situation is simply cleared by the current limitation of the inverter 4. As a consequence, the electrical appliance 9*b* can move over to normal operation again almost immediately.

In any case, the destructive impact of a fault arc A is significantly reduced, and the risk for damaging the electrical appliance 9*b* and injury of personnel is significantly reduced compared to prior art electrical appliances 9*a*.

In case of a fault arc event, the fault arc detection device 15*b* and/or the online, double-conversion UPS 1*b* can also output an alarm signal to inform personnel responsible for the operation of the electrical appliance 9*b*.

It should also be noted that even in case of an event that mistakenly is interpreted as a fault arc A, the online, double-conversion UPS 1*b* simply stays in normal mode and supplies the electrical consumers via the rectifier inverter combination. Possibly, a superfluous alarm signal is output. However, this is a negligible impact on system reliability in critical applications.

Concluding, the energy of a fault arc A depends on arc current level and the operation time of circuit protective devices 13*a* . . . 13*h*. The arc current in traditional electrical appliances 9*a* (FIG. 1) is much higher than in the proposed electrical appliances 9*b* (FIG. 2). In the electrical appliance 9*a*, the fault arc A is fed from power grid 10 via the bypass switch 6, whereas in the electrical appliance 9*b*, arc current is limited by the current limit of the inverter 4.

The energy of the fault arc A can be reduced even more, if the inverter 4 is turned off when the signal causing the bypass switch held 6 open is received. The reason is that the inverter 4 can be turned off very fast (e.g. in around 2 ms or even faster). Accordingly, the control unit 7 may be connected to the inverter 4 (particularly to the gate inputs or base inputs of switching transistors of the inverter 4) and force the inverter 4 (i.e. its switching transistors) to the non-conductive state when said signal is received.

Alternatively or in addition, the rectifier 3 can be turned off when the signal causing the bypass switch 6 held open is received if the rectifier 3 is an active rectifier comprising transistors. If there is no battery 8 being connected to the output of the rectifier 3 and to the input of the inverter 4, it is sufficient to turn off the rectifier 3 (and/or the inverter 4). If there is a battery 8 being connected to the output of the rectifier 3 and to the input of the inverter 4, also the battery 8 may be disconnected from the inverter 4 when said signal is received. This is particularly true if just the rectifier 3 (and not the inverter 4) is turned off when said signal is received.

Accordingly, the control unit 7 may be connected to the rectifier 3 (particularly to the gate inputs or base inputs of transistors of the rectifier 3) and force the rectifier 3 (i.e. its transistors) to the non-conductive state when said signal is received and/or the control unit 7 may be connected to an optional battery switch 18 between the battery 8 and the rectifier 3 and the inverter 4, which battery switch 18 is forced to its non-conductive state when said signal is received.

It is noted that the invention is not limited to the embodiments disclosed hereinbefore, but combinations of the different variants are possible. In reality, the arrangements may have more or fewer parts than shown in the figures. The arrangements and parts thereof may also be shown in different scales and may be bigger or smaller than depicted. Finally, the description may comprise the subject matter of further independent inventions.

It should also be noted that the term "comprising" does not exclude other elements and the use of articles "a" or "an" does not exclude a plurality. Also, elements described in association with different embodiments may be combined. It should also be noted that reference signs in the claims should not be construed as limiting the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1*a*, 1*b* online, double-conversion UPS
2 UPS input
3 rectifier
4 inverter
5 UPS output
6 bypass switch
7 control unit
8 battery
9*a*, 9*b* electrical appliance
10 power grid (AC mains)
11*a*, 11*b* appliance section 12a, 12b short-circuiting switch
13a . . . 13h circuit breaker
14 override input
15a, 15b fault arc detection device
16a, 16b current detector
17a . . . 17f light detector
18 battery switch
A fault arc

What is claimed is:

1. A combined power supply and arc quenching device, comprising:
   a fault arc detection device; and
   an online, double-conversion uninterruptible power supply, comprising:
     a UPS input;
     a rectifier, whose input is connected to the UPS input;
     an inverter, whose input is connected to an output of the rectifier;
     a UPS output connected to an output of the inverter;
     a bypass switch connected between the UPS input and the UPS output;
     a control unit configured to close the bypass switch in case of excessive output current and/or excessive voltage drop and/or excessive power demand at the UPS output;
     an override input, which, when activated, is configured to inhibit closing the bypass switch; and
     a battery connected to the output of the rectifier and to the input of the inverter,
   wherein an output of the fault arc detection device is connected to the override input of the online, double-conversion uninterruptible power supply such that the bypass switch is kept open if a fault arc is detected by the fault arc detection device.

2. The combined power supply and arc quenching device of claim 1, wherein the override input is connected to an input of the control unit.

3. The combined power supply and arc quenching device of claim 2, wherein the override input, when activated, is configured to turn off the inverter and/or the rectifier.

4. The combined power supply and arc quenching device of claim 3, wherein the override input, when activated, is configured to disconnect the battery from the inverter.

5. The combined power supply and arc quenching device according to claim 1, wherein the fault arc detection device comprises a current detector and/or a light detector.

6. An electrical appliance, comprising:
   a grid connection to a power grid;
   the combined power supply and arc quenching device according to claim 1, the UPS input of the combined power supply and arc quenching device being connected to the grid connection;
   an electrical consumer connected to the UPS output; and
   a circuit breaker between the grid connection and the electrical consumer configured to disconnect the electrical consumer from the power grid a) in case of an excessive current flowing over the circuit breaker and/or b) by a fault arc signal from the combined power supply and arc quenching device being connected to the circuit breaker.

7. A method of quenching a fault arc in the electrical appliance according to claim 6, comprising the steps of:
   detecting the fault arc by the fault arc detection device; and
   sending a signal from the fault arc detection device to the online, double-conversion uninterruptible power supply causing the bypass switch to be held open.

8. The method according to claim 7, wherein the inverter is turned off when the signal is received.

9. The method according to claim 7, wherein the inverter is turned off when the signal is received and an output current at the UPS output is above a predetermined current threshold.

10. The method according to claim 8, wherein the inverter is turned on again after a predetermined time span.

11. The method according to claim 7, wherein the rectifier and is turned off when the signal is received.

12. The method according to claim 7, wherein a battery is disconnected from the inverter when the signal is received.

13. A combined power supply and arc quenching device, comprising:
   a fault arc detection device; and
   an online, double-conversion uninterruptible power supply, comprising:
     a UPS input;
     a rectifier, whose input is connected to the UPS input;
     an inverter, whose input is connected to an output of the rectifier;
     a UPS output connected to an output of the inverter;
     a bypass switch connected between the UPS input and the UPS output;
     a control unit configured to close the bypass switch in case of excessive output current and/or excessive voltage drop and/or excessive power demand at the UPS output; and
     an override input, which, when activated, is configured to inhibit closing the bypass switch,
   wherein an output of the fault arc detection device is connected to the override input of the online, double-conversion uninterruptible power supply such that the bypass switch is kept open if a fault arc is detected by the fault arc detection device.

14. The combined power supply and arc quenching device according to claim 13, wherein the fault arc detection device comprises a current detector and/or a light detector.

15. An electrical appliance, comprising:
   a grid connection to a power grid;
   the combined power supply and arc quenching device according to claim 13, the UPS input of the combined power supply and arc quenching device being connected to the grid connection;
   an electrical consumer connected to the UPS output; and
   a circuit breaker between the grid connection and the electrical consumer configured to disconnect the electrical consumer from the power grid a) in case of an excessive current flowing over the circuit breaker and/or b) by a fault arc signal from the combined power supply and arc quenching device being connected to the circuit breaker.

16. A method of quenching a fault arc in the electrical appliance according to claim 15, comprising the steps of:
   detecting the fault arc by the fault arc detection device; and
   sending a signal from the fault arc detection device to the online, double-conversion uninterruptible power supply causing the bypass switch to be held open.

17. The method according to claim 16, wherein the inverter is turned off when the signal is received.

18. The method according to claim 16, wherein the inverter is turned off when the signal is received and an output current at the UPS output is above a predetermined current threshold.

19. The method according to claim 17, wherein the inverter is turned on again after a predetermined time span.

20. The method according to claim 16, wherein the rectifier and is turned off when the signal is received.

21. The method according to claim 16, wherein a battery is disconnected from the inverter when the signal is received.

* * * * *